US009123998B1

(12) United States Patent
LoRe

(10) Patent No.: US 9,123,998 B1
(45) Date of Patent: Sep. 1, 2015

(54) LIGHTNING PROTECTED RADOME SYSTEM

(71) Applicant: The Boeing Company, Chicago, IL (US)

(72) Inventor: Michael M. LoRe, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 74 days.

(21) Appl. No.: 14/196,415

(22) Filed: Mar. 4, 2014

(51) Int. Cl.
*H01Q 1/42* (2006.01)
*B64D 45/02* (2006.01)
*H01Q 1/50* (2006.01)
*B32B 15/04* (2006.01)

(52) U.S. Cl.
CPC .............. *H01Q 1/425* (2013.01); *B64D 45/02* (2013.01); *H01Q 1/422* (2013.01); *H01Q 1/50* (2013.01); *B32B 15/04* (2013.01)

(58) Field of Classification Search
CPC ......... H01Q 1/422; H01Q 1/425; H01Q 1/50; B32D 45/02; B32B 15/04–15/20
USPC .................................................. 361/216–218
See application file for complete search history.

(56) References Cited

U.S. PATENT DOCUMENTS

| | | | | |
|---|---|---|---|---|
| 3,560,986 A * | 2/1971 | Hoots et al. | ................... | 343/872 |
| 3,769,623 A | 10/1973 | Fletcher et al. | | |
| 3,789,404 A | 1/1974 | Munk | | |
| 4,287,520 A | 9/1981 | Van Vliet et al. | | |
| 4,352,142 A * | 9/1982 | Olson | ........................... | 361/218 |
| 4,839,771 A * | 6/1989 | Covey | ........................... | 361/218 |
| 5,707,723 A * | 1/1998 | Harrison et al. | ........... | 428/313.3 |
| 7,525,785 B2 * | 4/2009 | Rawlings | ....................... | 361/216 |
| 7,829,796 B2 * | 11/2010 | Feider et al. | .................. | 174/261 |
| 8,206,823 B2 * | 6/2012 | Schaaf et al. | ................. | 428/341 |
| 8,581,103 B2 * | 11/2013 | Aspas Puertolas | ........... | 174/251 |
| 8,882,023 B2 * | 11/2014 | Brown | ......................... | 244/1 A |
| 2010/0103582 A1 * | 4/2010 | Shimp et al. | .................. | 361/220 |
| 2011/0318981 A1 * | 12/2011 | Duval et al. | ....................... | 442/1 |
| 2013/0105190 A1 * | 5/2013 | Knyazev | ........................... | 174/2 |

OTHER PUBLICATIONS

Gardiner, "Lightning Strike Protection for Composite Structures," *Composites World* (2006).
Al-Joumayly et al., "A Generalized Method for Synthesizing Low-Profile, Band-Pass Frequency Selective Surfaces With Non-Resonant Constituting Elements," *IEEE Transactions on Antennas and Propagation*, vol. 58, No. 12 (2010).
Merrill et al., "Effective Medium Theories for Artificial Materials Composed of Multiple Sizes of Spherical Inclusions in a Host Continuum," *IEEE Transactions on Antennas and Propagation*, vol. 47, No. 1 (1999).

* cited by examiner

*Primary Examiner* — Howard Williams
(74) *Attorney, Agent, or Firm* — Walters & Wasylyna LLC

(57) ABSTRACT

A radome system including an antenna, the antenna operating within a predetermined frequency band, and a radome defining an enclosed volume, wherein the antenna is housed within the enclosed volume, the radome including a layered structure having an external surface and an internal surface, the layered structure including an external structural layer proximate the external surface and a core layer below the external structural layer, the core layer including a Faraday cage layer positioned between artificial dielectric layers.

20 Claims, 6 Drawing Sheets

LIGHTNING PROTECTED RADOME SYSTEM

FIELD

This application relates to radomes and, more particularly, to radomes that are transparent to radio waves within a predetermined frequency band, yet protect the antennas and electronics encased behind the radome from lighting strikes and electromagnetic pulses.

BACKGROUND

Antennas include delicate components that may be damaged when exposed to ambient conditions. Therefore, antennas are often housed in radomes that prevent physical matter, such as debris, precipitation, moving air and the like, from coming into direct physical contact with antenna components. As such, a radome functions as a physical barrier to potentially damaging matter, while still permitting the propagation of electromagnetic radiation, particularly radio waves, to and from the protected antenna.

Vehicles, such as aircraft, marine vehicles, ground vehicles and spacecraft, typically use radar for various purposes (e.g., weather and/or navigation). The radar antenna is typically housed in a radome that is transparent to radar waves over a frequency band dictated by the operational requirements of the radar. For example, the nose cone of an aircraft may house a weather radar operating within the X band of the radio spectrum, thereby requiring that the nose cone be configured as an X band tuned radome.

Lightning strikes and electromagnetic pulses can cause significant damage to sensitive electronics, such as radar antennas. Because aircraft are vulnerable to lightning strikes, steps have been taken to introduce lightning strike protection to aircraft radomes. As one example, lightning diverter strips have been added to the exterior of aircraft radomes to guide away lightning-generated currents. As another example, highly conductive metal screening has been embedded directly into the composite material forming the aircraft radome. However, in both examples, gaps in the lightning protection must be formed to provide a window through which the radar waves may propagate. Unfortunately, such windows leave the radar antenna vulnerable to lightning strikes and electromagnetic pulses.

Accordingly, those skilled in the art continue with research and development efforts in the field of radomes.

SUMMARY

In one embodiment, the disclosed radome system may include an antenna, the antenna operating within a predetermined frequency band, and a radome defining an enclosed volume, wherein the antenna is housed within the enclosed volume, the radome including a layered structure having an external surface and an internal surface, the layered structure including an external structural layer proximate the external surface and a core layer below the external structural layer, the core layer including a Faraday cage layer positioned between artificial dielectric layers.

In another embodiment, discloses is a method for protecting an antenna, wherein the antenna operates within a predetermined frequency band. The method may include the steps of (1) assembling a radome including a layered structure having an external surface and an internal surface, the layered structure including an external structural layer proximate the external surface, an internal structural layer proximate the internal surface and a core layer between the external and internal structural layers, the core layer including a Faraday cage layer positioned between artificial dielectric layers; (2) selecting the Faraday cage layer and the artificial dielectric layers such that the radome is substantially transparent to radio waves over the predetermined frequency band; and (3) housing the antenna within the radome.

Other embodiments of the disclosed lightning protected radome system and method will become apparent from the following detailed description, the accompanying drawings and the appended claims.

DETAILED DESCRIPTION

It has now been discovered that a radome may be constructed from a lightning-resistant Faraday cage material that fully encloses the associated antenna without the need for forming a physical window in the lightning-resistant Faraday cage material to allow for radio wave propagation. Because a physical window is not required, the disclosed radome system may significantly improve lightning strike and electromagnetic pulse protection. Such a significant result may be achieved by positioning at least one layer of the lightning-resistant Faraday cage material between at least two artificial dielectric layers, wherein the effective capacitance of the artificial dielectric layers and/or the effective inductance of the lightning-resistant Faraday cage material, among other possible parameters, may be tuned to render the radome transparent to radio waves over a desired frequency band.

Figure 1:
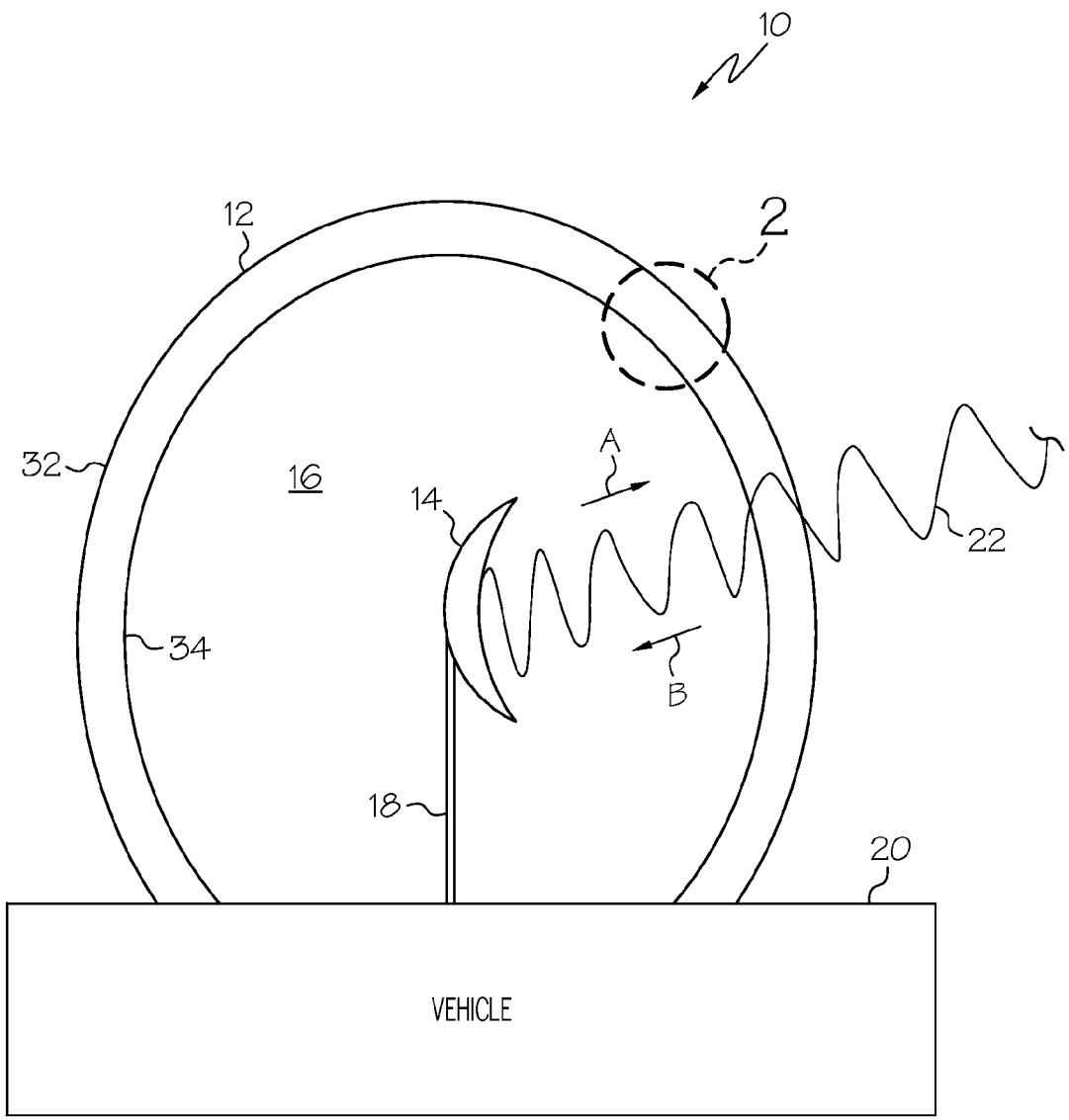
FIG. 1 is a schematic cross-sectional view of one embodiment of the discloses lightning protected radome system.

Referring to FIG. 1, one embodiment of the disclosed lightning protected radome system, generally designated 10, may include a radome 12 and an antenna 14. The radome 12 may define an enclosed volume 16 and the antenna 14 may be housed within the enclosed volume 16 of the radome 12. Optionally, the antenna 14 may be supported within the radome 12 by a support structure 18, such as a mast, tower, cable, pivot or the like.

As shown in FIG. 1, the radome 12 and associated antenna 14 may be mounted on a vehicle 20, which may be a terrestrial vehicle (e.g., an aircraft, a boat/ship or a ground vehicle) or a space vehicle (e.g., a spacecraft or a satellite). As one example, the radome 12 may form the nose cone of a fixed-wing aircraft. As another example, the radome 12 may be formed as a blister connected to the fuselage of a fixed-wing or rotating wing aircraft. However, the radome 12 and associated antenna 14 may be also be stationary relative to the Earth (though the antenna 14 may still move within the radome 12), such as secured to the ground, a building or other structure, or the like.

The antenna 14 may be any apparatus or system that transmits (arrow A), receives (arrow B), or both transmits and receives (arrows A and B) radio waves 22. As used herein, "radio wave" or "radio waves" broadly refers to electromagnetic radiation within the portion of the electromagnetic spectrum spanning from about 3 Hz to about 3000 GHz. The antenna 14 may be stationary or moving (e.g., rotating). As one specific, non-limiting example, the antenna 14 may be a radio antenna. As another specific, non-limiting example, the antenna 14 may be a microwave antenna. As yet another specific, non-limiting example, the antenna 14 may be a radar antenna.

The antenna 14 may operate within a predetermined frequency band of the electromagnetic spectrum. As one specific, non-limiting example, the antenna 14 may operate at a frequency ranging from about 5 GHz to about 50 GHz. As another specific, non-limiting example, the antenna 14 may operate within the X band (e.g., from about 8 GHz to about 12 GHz). As another specific, non-limiting example, the antenna 14 may operate within the Ku band (e.g., from about 12 GHz to about 18 GHz). As yet another specific, non-limiting example, the antenna 14 may operate within the $K_A$ band (e.g., from about 24 GHz to about 40 GHz).

The radome 12 may have a size and shape dictated by the size and shape of the antenna 14. Specifically, the size and shape of the radome 12 may be sufficient to fully enclose the antenna 14, while, if necessary, allowing the antenna 14 to move within the enclosed volume 16 of the radome 12. While an ovular-shaped radome 12 is shown in FIG. 1, those skilled in the art will appreciate that radome shapes can widely vary.

Figure 2:
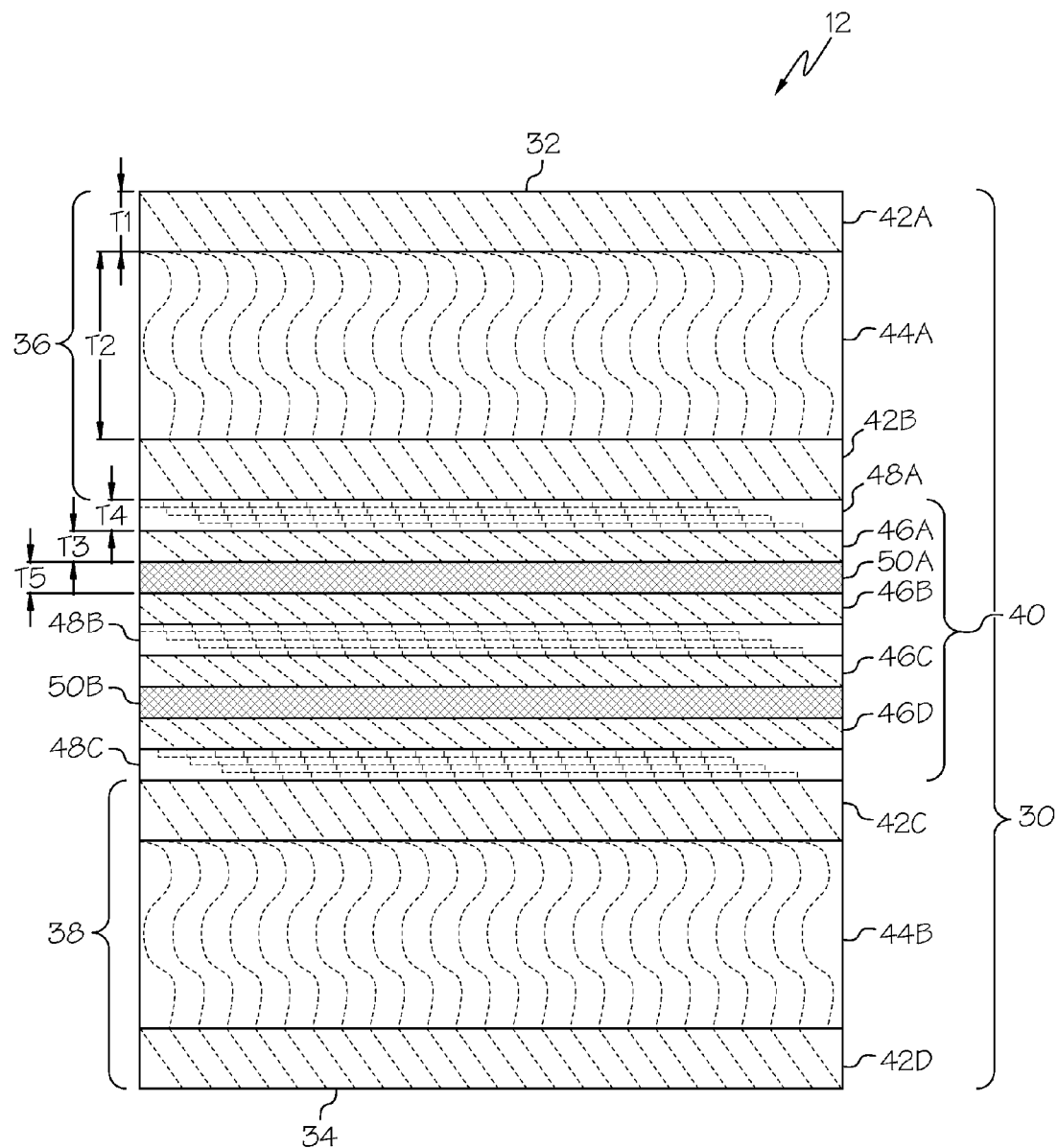
FIG. 2 is a schematic cross-sectional view of a portion of the radome of the system of FIG. 1.

Referring now to FIG. 2, the radome 12 may be constructed as a layered structure 30 having an external surface 32 and an internal surface 34. An external structural layer 36 of the layered structure 30 may be positioned proximate the external surface 32, an internal structural layer 38 of the layered structure 30 may be positioned proximate the internal surface 34, and a core layer 40 of the layered structure 30 may be positioned between the external structural layer 36 and the internal structural layer 38. The external and internal structural layers 36, 38 may form the physical structure of the radome 12, while the core layer 40 may contain the Faraday cage 50 layer and artificial dielectric 48 layers.

Those skilled in the art will appreciate that variations to the general configuration (external structural layer—core layer—internal structural layer) of the layered structure 30 shown in FIG. 2 may be made without departing from the scope of the present disclosure. In one variation, the layered structure 30 of the radome 12 may include only the external structural layer 36 and the core layer 40. In another variation, the layered structure 30 of the radome 12 may include only the internal structural layer 38 and the core layer 40.

Still referring to FIG. 2, in one specific implementation, the layered structure 30 of the disclosed radome 12 may include outer skin layers 42A, 42B, 42C, 42D (generally, outer skin layers 42), spacer layers 44A, 44B (generally, spacer layers 44), inner skin layers 46A, 46B, 46C, 46D (generally, inner skin layers 46), artificial dielectric layers 48A, 48B, 48C (generally, artificial dielectric layers 48), and Faraday cage layers 50A, 50B (generally, Faraday cage layers 50). Outer skin layers 42A, 42B and spacer layer 44A may form the external structural layer 36 of the layered structure 30. Outer skin layers 42C, 42D and spacer layer 44B may form the internal structural layer 38 of the layered structure 30. Artificial dielectric layers 48A, 48B, 48C, inner skin layers 46A, 46B, 46C, 46D, and Faraday cage layers 50A, 50B may form the core layer 40 of the layered structure 30.

While a total of fifteen layers are shown in FIG. 2 making up the layered structure 30, in other implementations additional layers or fewer layers may be used. As one alternative, the core layer 40 may include three or more Faraday cage layers 50 and four or more artificial dielectric layers 48, with the Faraday cage layers 50 positioned between at least two of the artificial dielectric layers 48. As another alternative, the core layer 40 may include one Faraday cage layer 50 between two artificial dielectric layers 48. Other alternatives will become apparent to those skilled in the art and will not result in a departure from the scope of the present disclosure.

The outer skin layers 42 may be formed from various skin materials suitable for forming radomes. While use of flight-tested and approved materials is contemplated, many options are currently available and others may be developed in the future. As one general, non-limiting example, the outer skin layers 42 may be formed from or may include a composite material. As one specific, non-limiting example, the outer skin layers 42 may be formed from or may include resin impregnated fiberglass cloth.

The skin material selected for the outer skin layers 42 may be a dielectric. As one general example, the outer skin layers 42 may have a relative permittivity (dimensionless; measured at room temperature and 1 kHz) ranging from about 0.5 to about 5. As one specific example, the outer skin layers 42 may have a relative permittivity (dimensionless; measured at room temperature and 1 kHz) of about 3.0.

The outer skin layers 42 may have a cross-sectional thickness $T_1$, which may depend on the composition of the outer skin layers 42, among other possible factors. The cross-sectional thickness $T_1$ may be sufficient to impart structural rigidity to the radome 12. In one example, the outer skin layers 42 may have a cross-sectional thickness $T_1$ ranging from about 0.001 inches to about 0.1 inches. In another example, the outer skin layers 42 may have a cross-sectional thickness $T_1$ ranging from about 0.01 inches to about 0.09 inches. In yet another example, the outer skin layers 42 may have a cross-sectional thickness $T_1$ ranging from about 0.02 inches to about 0.05 inches.

The spacer layers 44 may space apart adjacent outer skin layers 42. To reduce overall weight of the radome 12, the material selected for the spacer layers 44 may have a lower density than the material selected for the outer skin layers 42. As one specific, non-limiting example, the spacer layers 44 may be formed from or may include syntactic foam.

The material selected for the spacer layers 44 may be a dielectric. As one general example, the spacer layers 44 may have a relative permittivity (dimensionless; measured at room temperature and 1 kHz) ranging from about 0.5 to about 5. As one specific example, the spacer layers 44 may have a relative permittivity (dimensionless; measured at room temperature and 1 kHz) of about 1.5.

The spacer layers 44 may have a cross-sectional thickness $T_2$, which may depend on the composition of the spacer layers 44, among other possible factors. The cross-sectional thickness $T_2$ of the spacer layers 44 may be greater than the cross-sectional thickness $T_1$ of the outer skin layers 42 such that the spacer layers 44 may space apart the outer skin layers 42 forming the external structural layer 36 and the internal structural layer 38. In one example, the cross-sectional thickness $T_2$ of the spacer layers 44 may be about 5 to about 30 times greater than the cross-sectional thickness $T_1$ of the outer skin layers 42. In another example, the cross-sectional thickness $T_2$ of the spacer layers 44 may be about 10 to about 20 times greater than the cross-sectional thickness $T_1$ of the outer skin layers 42. In yet another example, the cross-sectional thickness $T_2$ of the spacer layers 44 may be about 13 to about 18 times greater than the cross-sectional thickness $T_1$ of the outer skin layers 42. As one specific example, the spacer layers 44 may have a cross-sectional thickness $T_2$ ranging from about 0.1 inches to about 1 inch. As another specific example, the spacer layers 44 may have a cross-sectional thickness $T_2$ ranging from about 0.2 inches to about 0.5 inches.

The core layer 40 may be formed by alternating the artificial dielectric layers 48, the inner skin layers 46 and the Faraday cage layers 50 such that an inner skin layer 46 is positioned between adjacent artificial dielectric 48 and Faraday cage 50 layers, and such that each Faraday cage layer 50 is positioned between two artificial dielectric layers 48. However, the core layer 40 may be assembled in various ways, provided that all Faraday cage layers 50 are between two artificial dielectric layers 48.

The inner skin layers 46 may be formed from the same or similar skin materials used to form the outer skin layers 42. As one general, non-limiting example, the inner skin layers 46 may be formed from or may include a composite material. As one specific, non-limiting example, the inner skin layers 46 may be formed from or may include resin impregnated fiberglass cloth.

The skin material selected for the inner skin layers 46 may be a dielectric. As one general example, the inner skin layers 46 may have a relative permittivity (dimensionless; measured at room temperature and 1 kHz) ranging from about 0.5 to about 5. As one specific example, the inner skin layers 46 may have a relative permittivity (dimensionless; measured at room temperature and 1 kHz) of about 3.0.

The inner skin layers 46 may have a cross-sectional thickness $T_3$, which may depend on the composition of the inner skin layers 46, among other possible factors. The cross-sectional thickness $T_3$ of the inner skin layers 46 may be less than the cross-sectional thickness $T_1$ of the outer skin layers 42. In one example, the cross-sectional thickness $T_3$ of the inner skin layers 46 may be range from about 25 percent to about 100 percent of the cross-sectional thickness $T_1$ of the outer skin layers 42. In another example, the cross-sectional thickness $T_3$ of the inner skin layers 46 may be range from about 40 percent to about 60 percent of the cross-sectional thickness $T_1$ of the outer skin layers 42. As one specific, non-limiting example, the cross-sectional thickness $T_3$ of the inner skin layers 46 may be about 0.01 inches.

The artificial dielectric layers 48 may be formed using any available technique for forming an artificial dielectric having an effective capacitance. Those skilled in the art will appreciate that the effective capacitance of the artificial dielectric layers 48 may be a parameter that may be modified during the research and development phase to tune the radome 12 to a particular frequency band.

Figure 3A:
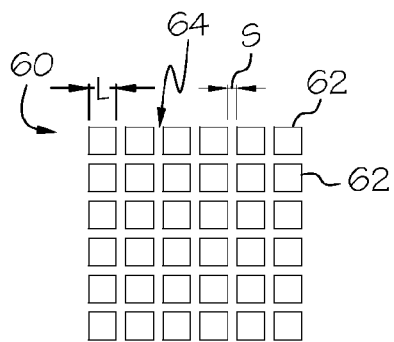
FIGS. 3A-3L show various optional configurations of the artificial dielectric layers of the radome of FIG. 2.
Figure 3B:
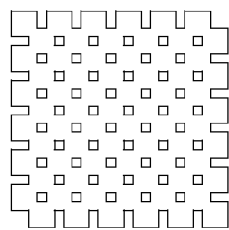
Figure 3C:
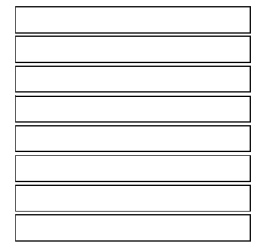
Figure 3D:
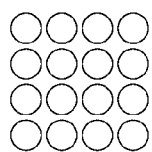
Figure 3E:
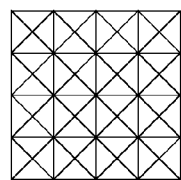
Figure 3F:
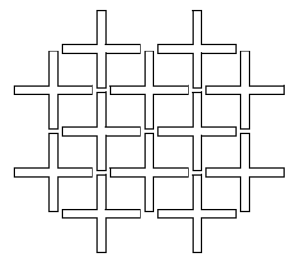
Figure 3G:
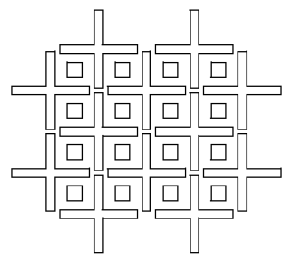
Figure 3H:
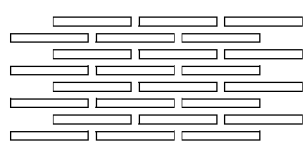
Figure 3I:
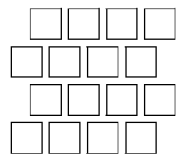
Figure 3J:
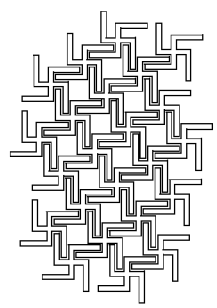
Figure 3K:
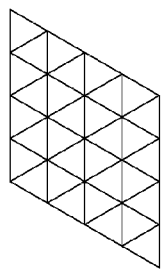
Figure 3L:
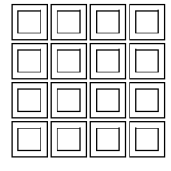

Referring to FIG. 3A, each artificial dielectric layer 48 may include an array 60 of electrically conductive patches 62. Each patch 62 in the array 60 may be separated from adjacent patches 62 by a gap 64.

The composition and thickness of the patches 62 may be design considerations. For example, the patches 62 may be formed from a highly conductive metallic material, such as copper, silver and the like. The cross-sectional thickness $T_4$ of the patches 62 may range from about 0.0001 inches to about 0.01 inches, such as from about 0.0005 inches to about 0.0015 inches.

The gap 64 may have a spacing S, which may be sub-wavelength. For example, the spacing S of the gap 64 may be less than the relevant wavelength of the radio waves 22 (FIG. 1), such about one-half or less of the relevant wavelength of the radio waves 22, or even one-tenth or less of the relevant wavelength of the radio waves 22.

The array 60 may be formed using any available technique. As one specific, non-limiting example, the array 60 may be formed by etching gaps 64 into a film, such as a film of metallic material, thereby leaving behind the array 60 of patches 62. Use of laser etching and chemical etching is contemplated, though any technique (etching or other) may be used that is capable of forming patches 62 having the desired morphology.

Still referring to FIG. 3A, the effective capacitance $C_{\textit{eff}}$ of the artificial dielectric layer 48 may be calculated using Equation 1, as follows:

$$C_{\textit{eff}} = \varepsilon_o \varepsilon_{sub} \frac{2D}{\pi}\left(\csc\left(\frac{\pi S}{2D}\right)\right) \qquad \text{Eq. 1}$$

where $\varepsilon_o$ is the permittivity of free space, $\varepsilon_{sub}$ is the permittivity of the surrounding dielectric material (skin layers 42, 46), S is the spacing of the gap 64 (see FIG. 3A), and D is the length L (FIG. 3A) of each patch 62 plus the spacing S on both sides of the patch 62. Therefore, the effective capacitance of the artificial dielectric layers 48 may be modified by modifying the size of the patches 62, the size of the gap 64 between the patches and/or the composition of the adjacent skin layers 42, 46.

As one example, the effective capacitance of each artificial dielectric layer 48 may range from about 0.01 pF to about 1 pF. As another example, the effective capacitance of each artificial dielectric layer 48 may range from about 0.02 pF to about 0.8 pF. As yet another example, the effective capacitance of each artificial dielectric layer 48 may range from about 0.1 pF to about 0.5 pH.

At this point, those skilled in the art will appreciate that the array 60 of square patches 62 shown in FIG. 3A is only one specific example of a suitable artificial dielectric useful as the artificial dielectric layers 48. As shown in FIGS. 3B-3L, patches of various sizes and periodicities may be used. Many other patch morphologies are also contemplated, but are too numerous to fully illustrate.

As an alternative to using patches 62, the artificial dielectric layers 48 may be formed by embedding conductive inclusions into a matrix material (e.g., phenolic resin). The conductive inclusions may be metal fibers, metal ellipsoids, metal spheres or the like dispersed in a resin matrix. Similar to the patch example shown in FIG. 3A, the size and spacing of the conductive inclusions in the resin matrix may govern the effective capacitance of the artificial dielectric layers 48 formed therefrom.

Referring back to FIG. 2, the Faraday cage layers 50 may be formed from a lightning-resistant Faraday cage material such that the Faraday cage layers 50 have an effective inductance. Those skilled in the art will appreciate that the effective inductance of the Faraday cage layers 50 may be a parameter that may be selected (e.g., by appropriate material selection or design) during the research and development phase to tune the radome 12 to a particular frequency band.

Any network of electrically conductive material in a continuous direct current path may suitably form a Faraday cage material. When the Faraday cage material if formed from a highly electrically conductive material (e.g., copper, silver or aluminum), and the basis weight and cross-sectional thickness of the Faraday cage material are of a sufficient magnitude, the Faraday cage material may become lightning-resistant, thereby rending the material suitable for use in the Faraday cage layers 50 of the disclosed radome 12. A lightning-resistant Faraday cage material may allow lightning-induced (or EMP-induced) currents to flow along the material without significantly burning up the material, particularly at locations away from the lightning attachment location.

Figure 4A:
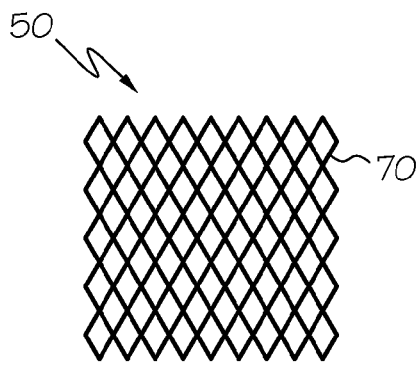
FIGS. 4A-4G show various optional configurations of the Faraday cage layers of the radome of FIG. 2.
Figure 4B:
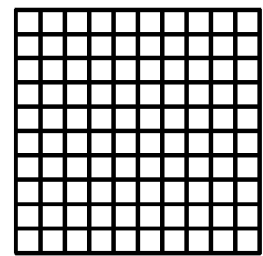
Figure 4C:
Figure 4D:
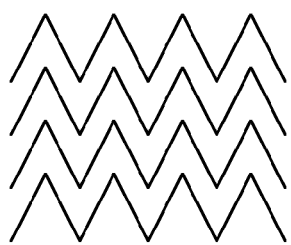
Figure 4E:
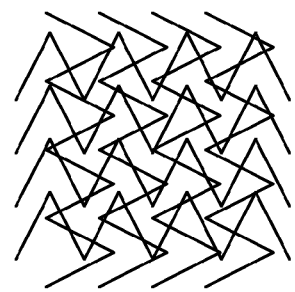
Figure 4F:
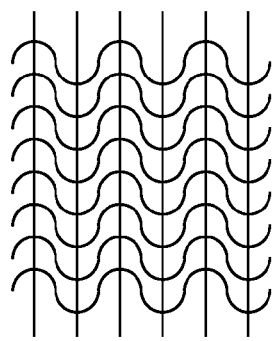
Figure 4G:
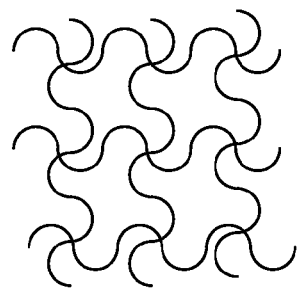

Referring to FIG. 4A, in one specific implementation, the Faraday cage layers 50 may be formed from or may include a nonwoven metallic mesh 70 of highly conductive metallic material. As one specific, non-limiting example, the nonwoven metallic mesh 70 forming the Faraday cage layers 50 may be ASTROSTRIKE® screening, which is a lightning-resistant Faraday cage material commercially available from Astroseal Products Mfg. Corporation of Chester, Conn.

Non-limiting examples of highly conductive materials suitable for forming the mesh 70 include copper, aluminum and silver. The cross-sectional thickness $T_5$ of the mesh 70 may range from about 0.001 inches to about 0.01 inches, such as from about 0.003 inches to about 0.007 inches.

The effective inductance $L_{eff}$ of the mesh 70 of the Faraday cage layer 50 may be calculated using Equation 2, as follows:

$$L_{eff} = \mu_o \mu_{sub} \frac{D}{2\pi}\left(\csc\left(\frac{\pi w}{2D}\right)\right) \quad \text{Eq. 2}$$

where $\mu_o$ is the permeability of free space, $\mu_{sub}$ is the permeability of the surrounding dielectric material (skin layers 46), D is the length of each discreet unit (e.g., intersection) of the mesh 70, and w is the width of the electrically conductive material forming the mesh 70. Therefore, the effective inductance of the Faraday cage layer 50 may be modified by modifying the configuration of the mesh 70 and/or the composition of the adjacent skin layers 46.

As one example, the effective inductance of each Faraday cage layer 50 may range from about 50 pH to about 500 pH. As another example, the effective inductance of each Faraday cage layer 50 may range from about 100 pH to about 400 pH. As yet another example, the effective inductance of each Faraday cage layer 50 may range from about 200 pH to about 300 pH.

The width w (Eq. 2) of the electrically conductive material forming the mesh 70 may be sub-wavelength. For example, the width w may be less than the relevant wavelength of the radio waves 22 (FIG. 1), such about one-half or less of the relevant wavelength of the radio waves 22, or even one-tenth or less of the relevant wavelength of the radio waves 22.

At this point, those skilled in the art will appreciate that the mesh 70 having a crosshatched configuration shown in FIG. 4A is only one specific example of a suitable lightning-resistant Faraday cage material useful in or as the Faraday cage layer 50. Conductive networks having various morphologies may be used without departing from the scope of the present disclosure. Several suitable alternative examples of meshes and other conductive networks useful in (or as) a Faraday cage layer 50 of the layered structure 30 of the disclosed radome 12 are shown in FIGS. 4B-4G.

As will become apparent from the examples below, design/selection of the artificial dielectric layers 48 and the Faraday cage layers 50, and consideration of the permittivity of the other layers 42, 44, 46 forming the layered structure 30 of the radome 12, may facilitate tuning the radome 12 to a particular frequency band. Therefore, the radome 12 may be engineered to accommodate the radio waves 22 (FIG. 1) of the associated antenna 14 (FIG. 1), while being fully enclosed in a protective lightning-resistant Faraday cage material.

EXAMPLES

Example 1

Radome Tuned to X Band

A fifteen-layer radome was designed as shown in FIG. 2. Composition and thickness data are provided in Table 1.

TABLE 1

| Layer (FIG. 2) | Composition | Thickness (inches) |
|---|---|---|
| 42A | Resin impregnated fiberglass cloth | 0.02 |
| 44A | Syntactic foam | 0.29 |
| 42B | Resin impregnated fiberglass cloth | 0.02 |
| 48A | Artificial dielectric | 0.001 |
| 46A | Resin impregnated fiberglass cloth | 0.01 |
| 50A | ASTROSTRIKE ® screening | 0.005 |
| 46B | Resin impregnated fiberglass cloth | 0.01 |
| 48B | Artificial dielectric | 0.001 |
| 46C | Resin impregnated fiberglass cloth | 0.01 |
| 50B | ASTROSTRIKE ® screening | 0.005 |
| 46D | Resin impregnated fiberglass cloth | 0.01 |
| 48C | Artificial dielectric | 0.001 |
| 42C | Resin impregnated fiberglass cloth | 0.02 |
| 44B | Syntactic foam | 0.29 |
| 42D | Resin impregnated fiberglass cloth | 0.02 |

A proprietary aerospace flight-tested resin impregnated fiberglass cloth was used. The resin impregnated fiberglass cloth layers (outer skin layers 42A, 42B, 42C, 42D and inner skin layers 46A, 46B, 46C, 46D) had a permittivity (dimensionless; measured at room temperature and 1 kHz) of about 3.3.

A proprietary aerospace flight-tested syntactic foam was used. The syntactic foam layers (spacer layers 44A, 44B) had a permittivity (dimensionless; measured at room temperature and 1 kHz) of about 1.9.

The artificial dielectric layers were configured as arrays of metal patches as shown in FIG. 3A. The size and spacing of the patches in the arrays provided an effective capacitance of about 0.5 pF for each artificial dielectric layer.

The ASTROSTRIKE® screening was a copper mesh screening, and was obtained from Astroseal Products Mfg. Corporation of Chester, Conn. The ASTROSTRIKE® screening was measured to have an effective inductance of about 280 pH.

Figure 5:
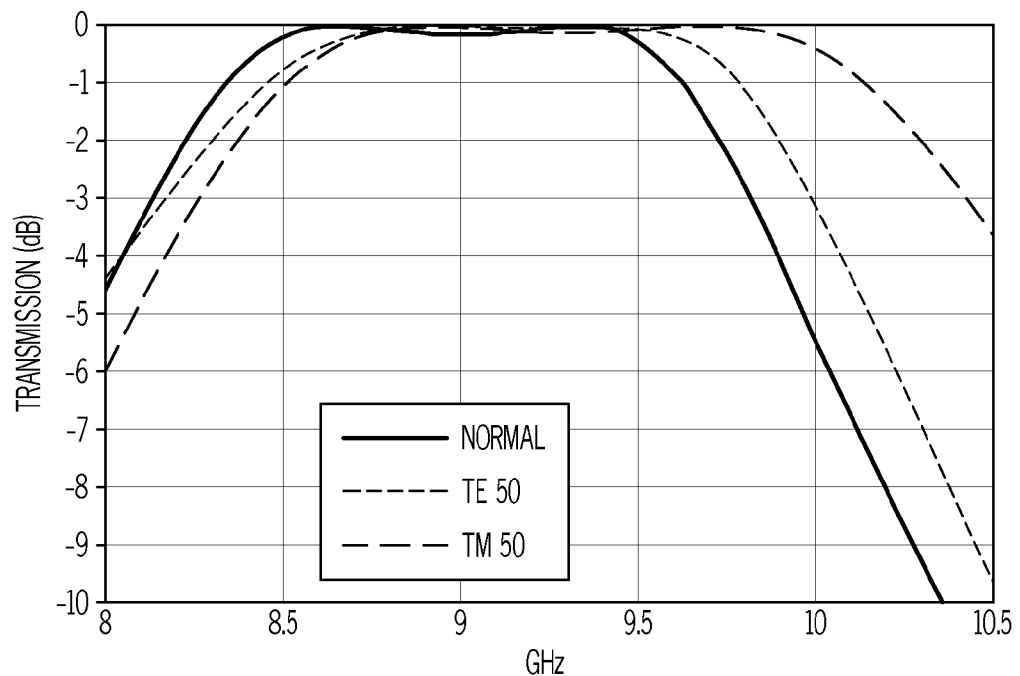
FIG. 5 is a graphical illustration of transmission versus frequency for a first example radome.

As shown in FIG. 5, a plot of transmission-versus-frequency for the radome of Example 1 shows almost 100 percent transmission over the frequency band ranging from about 8.5 GHz to about 9.5 GHz, which correspond to the X band.

Example 2

Radome Tuned to Ku Band

A fifteen-layer radome was designed as shown in FIG. 2. Composition and thickness data are provided in Table 2.

TABLE 2

| Layer (FIG. 2) | Composition | Thickness (inches) |
|---|---|---|
| 42A | Resin impregnated fiberglass cloth | 0.02 |
| 44A | Syntactic foam | 0.12 |
| 42B | Resin impregnated fiberglass cloth | 0.02 |
| 48A | Artificial dielectric | 0.001 |

TABLE 2-continued

| Layer (FIG. 2) | Composition | Thickness (inches) |
|---|---|---|
| 46A | Resin impregnated fiberglass cloth | 0.01 |
| 50A | ASTROSTRIKE ® screening | 0.005 |
| 46B | Resin impregnated fiberglass cloth | 0.01 |
| 48B | Artificial dielectric | 0.001 |
| 46C | Resin impregnated fiberglass cloth | 0.01 |
| 50B | ASTROSTRIKE ® screening | 0.005 |
| 46D | Resin impregnated fiberglass cloth | 0.01 |
| 48C | Artificial dielectric | 0.001 |
| 42C | Resin impregnated fiberglass cloth | 0.02 |
| 44B | Syntactic foam | 0.12 |
| 42D | Resin impregnated fiberglass cloth | 0.02 |

The same proprietary aerospace flight-tested resin impregnated fiberglass cloth used in Example 1 was also used in Example 2. The resin impregnated fiberglass cloth layers (outer skin layers 42A, 42B, 42C, 42D and inner skin layers 46A, 46B, 46C, 46D) had a permittivity (dimensionless; measured at room temperature and 1 kHz) of about 3.3.

The proprietary aerospace flight-tested syntactic foam used in Example 1 was also used in Example 2. The syntactic foam layers (spacer layers 44A, 44B) had a permittivity (dimensionless; measured at room temperature and 1 kHz) of about 1.9.

The artificial dielectric layers were configured as arrays of metal patches as shown in FIG. 3A. The size and spacing of the patches in the arrays of layers 48A and 48C provided an effective capacitance of about 0.15 pF. The size and spacing of the patches in the array of layer 48B provided an effective capacitance of about 0.25 pF.

The same ASTROSTRIKE® screening used in Example 1 was also used in Example 2. The ASTROSTRIKE® screening was measured to have an effective inductance of about 280 pH.

Figure 6:
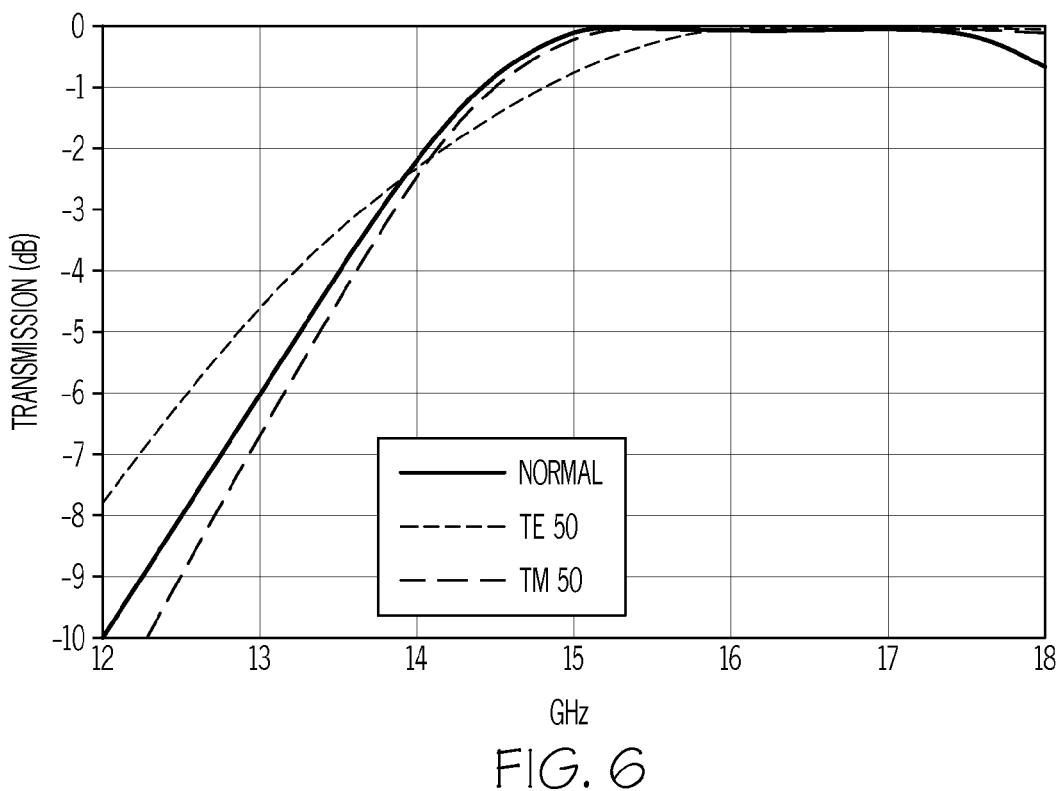
FIG. 6 is a graphical illustration of transmission versus frequency for a second example radome.

As shown in FIG. 6, a plot of transmission-versus-frequency for the radome of Example 2 shows almost 100 percent transmission over the frequency band ranging from about 15 GHz to about 17.5 GHz, which corresponds to the Ku band.

Example 3

Radome Tuned to KA Band

A fifteen-layer radome was designed as shown in FIG. 2. Composition and thickness data are provided in Table 3.

TABLE 3

| Layer (FIG. 2) | Composition | Thickness (inches) |
|---|---|---|
| 42A | Resin impregnated fiberglass cloth | 0.01 |
| 44A | Syntactic foam | 0.1 |
| 42B | Resin impregnated fiberglass cloth | 0.01 |
| 48A | Artificial dielectric | 0.001 |
| 46A | Resin impregnated fiberglass cloth | 0.015 |
| 50A | ASTROSTRIKE ® screening | 0.005 |
| 46B | Resin impregnated fiberglass cloth | 0.015 |
| 48B | Artificial dielectric | 0.001 |
| 46C | Resin impregnated fiberglass cloth | 0.015 |
| 50B | ASTROSTRIKE ® screening | 0.005 |
| 46D | Resin impregnated fiberglass cloth | 0.015 |
| 48C | Artificial dielectric | 0.001 |
| 42C | Resin impregnated fiberglass cloth | 0.01 |
| 44B | Syntactic foam | 0.1 |
| 42D | Resin impregnated fiberglass cloth | 0.01 |

The same proprietary aerospace flight-tested resin impregnated fiberglass cloth used in Examples 1 and 2 was also used in Example 3. The resin impregnated fiberglass cloth layers (outer skin layers 42A, 42B, 42C, 42D and inner skin layers 46A, 46B, 46C, 46D) had a permittivity (dimensionless; measured at room temperature and 1 kHz) of about 3.3.

The proprietary aerospace flight-tested syntactic foam used in Examples 1 and 2 was also used in Example 3. The syntactic foam layers (spacer layers 44A, 44B) had a permittivity (dimensionless; measured at room temperature and 1 kHz) of about 1.9.

The artificial dielectric layers were configured as arrays of metal patches as shown in FIG. 3A. The size and spacing of the patches in the arrays of layers 48A and 48C provided an effective capacitance of about 0.025 pF. The size and spacing of the patches in the array of layer 48B provided an effective capacitance of about 0.05 pF.

The same ASTROSTRIKE® screening used in Examples 1 and 2 was also used in Example 3. The ASTROSTRIKE® screening was measured to have an effective inductance of about 280 pH.

Figure 7:
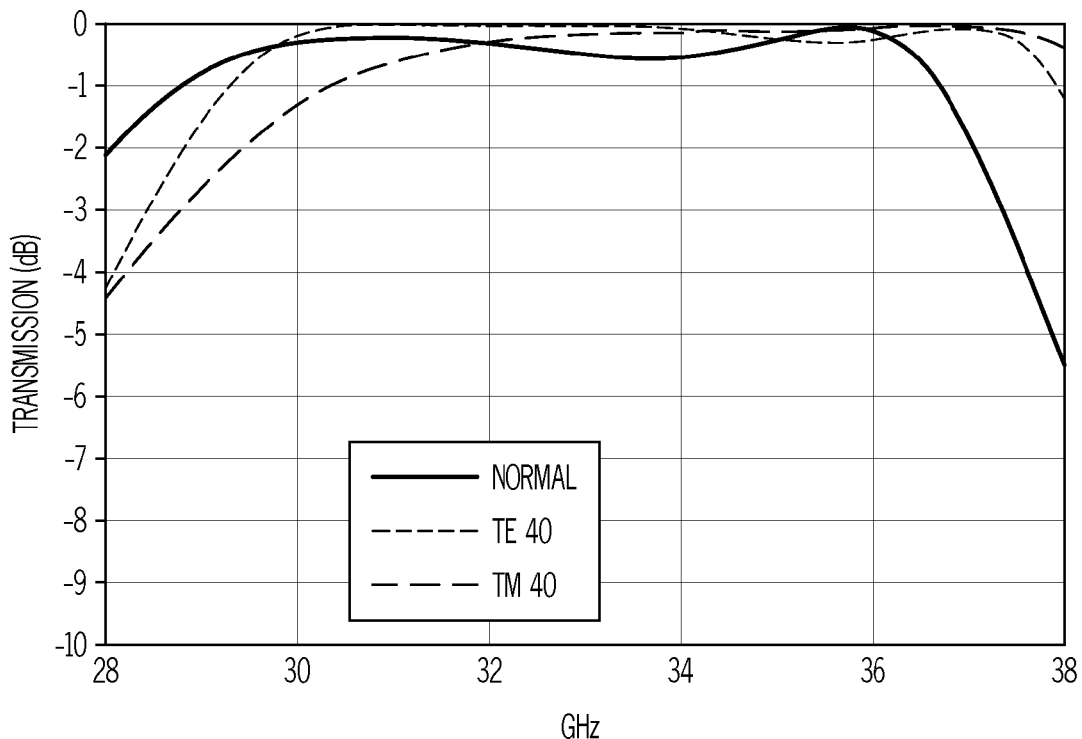
FIG. 7 is a graphical illustration of transmission versus frequency for a third example radome.

As shown in FIG. 7, a plot of transmission-versus-frequency for the radome of Example 3 shows near 100 percent transmission over the frequency band ranging from about 30 GHz to about 36 GHz, which corresponds to the $K_A$ band.

Accordingly, the disclosed radome system 10 may include a radome 12 that is fully enclosed by a lightning-resistant Faraday cage material (no window is required). The presence and configuration of the artificial dielectric layers 48 within the layered structure 30 of the radome 12 relative to the Faraday cage layers 50 may render the radome 12 substantially transparent to radio waves 22 in a predetermined frequency band required for operation of the antenna 14 housed within the radome 12. Therefore, the radome 12 may be opaque to many of damaging frequencies of a lightning strike or electromagnetic pulse, yet the radome 12 may be transparent to the operating frequencies of the antenna 14.

Figure 8:
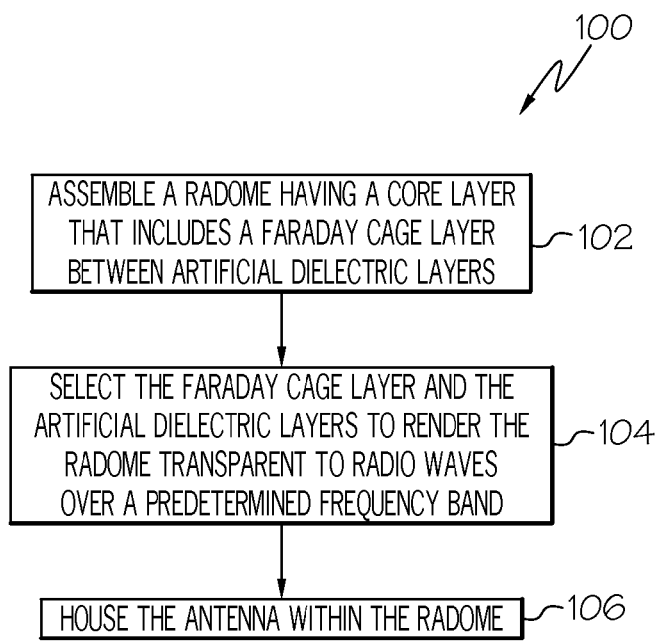
FIG. 8 is a flow chart depicting one embodiment of the disclosed method for protecting an antenna.

Referring to FIG. 8, also disclosed is a method, generally designated 100, for protecting an antenna, such as a radar antenna. The antenna may operate at a predetermined frequency band. The method 100 may provide physical protection from physical matter, such as debris, precipitation, moving air and the like, as well as protection from lightning strikes, electromagnetic pulses and other potentially damaging electrical or electromagnetic events.

As shown in Block 102, the method may begin with the step of assembling a radome. The radome may include a layered structure having an external surface and an internal surface. The layered structure may include an external structural layer proximate the external surface, an internal structural layer proximate the internal surface and a core layer between the external and internal structural layers. The core layer may include a Faraday cage layer positioned between artificial dielectric layers, as described in greater detail above.

At Block 104, the Faraday cage layer and the artificial dielectric layers may be selected such that the radome is substantially transparent to radio waves over the predetermined frequency band. Therefore, the Faraday cage layer may fully enclose the antenna without the need for a window, thereby excluding many harmful frequencies, but still allowing operation of the antenna.

At Block 106, the antenna may be housed within the radome. For example, the radome and antenna may be mounted to a vehicle, such as an aircraft.

Although various embodiments of the disclosed lightning protected radome system have been shown and described, modifications may occur to those skilled in the art upon reading the specification. The present application includes such modifications and is limited only by the scope of the claims.

What is claimed is:

1. A radome system comprising:
   an antenna, said antenna operating within a predetermined frequency band; and
   a radome defining an enclosed volume, wherein said antenna is housed within said enclosed volume, said radome comprising a layered structure having an external surface and an internal surface, said layered structure comprising:
   an external structural layer proximate said external surface; and
   a core layer below said external structural layer, said core layer comprising a Faraday cage layer positioned between artificial dielectric layers.

2. The radome system of claim 1 wherein said predetermined frequency band is within a range from about 5 GHz to about 50 GHz.

3. The radome system of claim 1 wherein said external structural layer comprises an outer skin layer and a spacer layer.

4. The radome system of claim 3 wherein said outer skin layer comprises a resin impregnated fiberglass cloth.

5. The radome system of claim 3 wherein said spacer layer comprises syntactic foam.

6. The radome system of claim 3 wherein said outer skin layer and said spacer layer comprise a dielectric.

7. The radome system of claim 1 wherein said external structural layer comprises a spacer layer positioned between two outer skin layers.

8. The radome system of claim 1 wherein said core layer further comprises an inner skin layer.

9. The radome system of claim 1 wherein said core layer comprises a plurality of Faraday cage layers alternating with a plurality of artificial dielectric layers.

10. The radome system of claim 1 wherein said Faraday cage layer comprises a lightning-resistant Faraday cage material.

11. The radome system of claim 1 wherein said Faraday cage layer comprises a nonwoven mesh of metallic material.

12. The radome system of claim 11 wherein said metallic material comprises copper or aluminum.

13. The radome system of claim 1 wherein said Faraday cage layer has an effective inductance ranging from about 50 pH to about 500 pH.

14. The radome system of claim 1 wherein said Faraday cage layer fully encloses said antenna.

15. The radome system of claim 1 wherein artificial dielectric layers have an effective capacitance ranging from about 0.01 pF to about 1 pF.

16. The radome system of claim 1 wherein each of said artificial dielectric layers comprises an array of patches.

17. The radome system of claim 1 wherein said layered structure further comprises an internal structural layer proximate said internal surface, wherein said core layer is positioned between said internal structural layer and said external structural layer.

18. The radome system of claim 17 wherein said internal structural layer comprises a spacer layer.

19. The radome system of claim 1 wherein said radome is substantially transparent to radio waves over a frequency band comprising said predetermined frequency band.

20. A method for protecting an antenna, said antenna operating within a predetermined frequency band, said method comprising the steps of:
   assembling a radome comprising a layered structure having an external surface and an internal surface, said layered structure comprising:
   an external structural layer proximate said external surface;
   an internal structural layer proximate said internal surface; and
   a core layer between said external structural layer and said internal structural layer, said core layer comprising a Faraday cage layer positioned between artificial dielectric layers;
   selecting said Faraday cage layer and said artificial dielectric layers such that said radome is substantially transparent to radio waves over said predetermined frequency band; and
   housing said antenna within said radome.

* * * * *